(12) United States Patent
Stovall et al.

(10) Patent No.: US 6,404,706 B1
(45) Date of Patent: Jun. 11, 2002

(54) LASER MOUNTING FOR A THERMALLY ASSISTED GMR HEAD

(75) Inventors: Ross W Stovall, Fremont; Yugang Wang, Milpitas; Carl J Carlson, Pleasanton, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/429,553

(22) Filed: Oct. 28, 1999

Related U.S. Application Data

(63) Continuation-in-part of application No. 09/248,766, filed on Feb. 12, 1999, now Pat. No. 6,016,290.

(51) Int. Cl.$^7$ .............................................. G11B 11/00
(52) U.S. Cl. ................................................... 369/13.17
(58) Field of Search ........................ 369/13.02, 13.01, 369/13.18, 13.19, 13.2, 13.21, 13.17; 360/324, 55, 114, 245.3, 245.4, 245.5, 370, 319, 313

(56) References Cited

U.S. PATENT DOCUMENTS

| | | | | |
|---|---|---|---|---|
| 5,199,090 A | * | 3/1993 | Bell | 385/33 |
| 5,295,122 A | * | 3/1994 | Murakami et al. | 369/13.17 |
| 5,446,613 A | * | 8/1995 | Rottmayer | 360/113 |
| 5,576,914 A | * | 11/1996 | Rottmayer et al. | 360/113 |
| 5,986,978 A | * | 11/1999 | Rottmayer et al. | 369/13.17 |
| 6,016,290 A | * | 1/2000 | Chen et al. | 369/13.17 |
| 6,072,151 A | * | 6/2000 | Jurgenson et al. | 219/121.85 |
| 6,130,863 A | * | 10/2000 | Wang et al. | 369/13 |

\* cited by examiner

*Primary Examiner*—Ali Neyzari
(74) *Attorney, Agent, or Firm*—Samuel A. Kassatly

(57) ABSTRACT

A head gimbal assembly includes a magneto-resistive read element integrated with a thermally assisted write element. The head gimbal assembly includes an optical waveguide positioned between two write poles to transmit a laser beam to a recording medium. The laser beam heats the medium sufficiently and lowers its coercivity in order to facilitate writing. A laser assembly is attached to a suspension for achieving direct coupling of the laser beam to an input end of the optical waveguide. The laser assembly is produced using cost effective wafer processing techniques. The use of silicon for the mounting block allows it to be used as a heat sink, for conducting heat away from the laser diode and into the suspension.

24 Claims, 12 Drawing Sheets

LASER MOUNTING FOR A THERMALLY ASSISTED GMR HEAD

CROSS-REFERENCE TO RELATED APPLICATIONS

This application is a continuation-in-part of U.S. application Ser. No. 09/248,766, filed on Feb. 12, 1999, which issued as U.S. Pat. No. 6,016,290, which is assigned to the same assignee as the present application, and which is incorporated herein by reference.

This application also relates to U.S. patent application Ser. No. 09/005,914, that issued as U.S. Pat. No. 5,986,978, and to PCT application Ser. No. PCT/US98/14588, filed on Jul. 16, 1998, both of which are assigned to the same assignee as the present application, and are incorporated herein by reference.

BACKGROUND OF THE INVENTION

1. Field of the Invention

The present invention relates in general to data storage systems such as disk drives. This invention relates in particular to a head gimbal assembly for use in magnetic and magneto-optical data storage systems to enable the writing of data to a magnetic data storage medium with the assistance of laser generated thermal energy. The thermally assisted magnetic writing of data on the storage medium significantly improves the thermal stability of the recorded data. More specifically, the invention relates to the design, fabrication and mounting of the laser assembly in order to couple the laser light to a waveguide which directs the light to the storage medium.

2. Description of Related Art

A conventional magnetic storage system typically includes a magnetic head that has a slider element and a magnetic read/write element, and which is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

Flying head designs have been proposed for use with optical and magneto-optical (MO) storage technology. One motivation for using the magneto-optical technology stems from the availability of higher areal density with magneto-optical storage disks than magnetic storage disks. However, despite the historically higher areal storage density available for magneto-optical disks drives, the conventional magneto-optical disk drive volumetric storage capacity rate of increase has generally not kept pace with the rate of increase of the volumetric storage capacity of magnetic disk drives. One limiting factor in conventional optical reading heads is the low signal to noise ratio exhibited by such heads at high data transfer rates.

Another limiting factor is that optical reading heads could require several optical components such as a laser, lenses, optical fibers, mirrors, and quarter wave plates. Besides the cost of these components, extensive alignment is required, rendering the design, manufacturing, and assembly of optical heads significantly more complex and costly than conventional magnetic heads.

Certain optical or magneto optical head designs mount the laser source either directly on the slider or remotely using an optical fiber and/or lenses to carry the laser beam to the disk. While mounting the laser source directly onto the slider can eliminate some components, this mounting approach could create a problem of stored heat generated by the laser. The slider does not provide a good heat sink for the laser generated thermal energy. This is important because current lasers become damaged if the temperature exceeds approximately 60° C. Since many drive temperatures during operation can easily reach 50° C. without the addition of the laser source, there is inadequate margin to accommodate the increase in temperature caused by the operation of the laser source.

An additional disadvantage of various optical and magneto optical heads is that the added mass of the optical components result in added seek time.

A further drawback of some optical and magneto optical heads is the added space required to mount the optical components in order to direct and focus the laser beam on the disk. This typically results in increased disk spacing or limiting the drive design to a single disk.

In addition to its cost, the use of an optical fiber to carry the light from the laser to a lens or waveguide necessitates alignment on both ends of the optical fiber.

Further, the use of an optical fiber attached to a slider on one end and coupled to a remote laser source at its other end adds pitch and roll variation and pitch and roll stiffness to the head gimbal assembly, resulting in greater flying height variation. This, in turn, decreases yield, control of performance, and reliability.

Still, other factors that limit the writing (or recording) on a magnetic disk at high data transfer rates (or frequencies) using conventional magnetic heads are the increasing requirements for higher magnetic fields and field gradients to achieve smaller and smaller bit size. High magnetic fields are difficult to achieve particularly with narrow tracks and miniaturized heads.

Therefore, there is still a long felt and still unsatisfied need for a read/write head which is structurally significantly less complex than conventional optical devices. The head requires a minimal number of optical components and minimal optical alignment. It can write at higher track densities and has better control of the data and servo tracks than conventional magnetic heads.

SUMMARY OF THE INVENTION

One aspect of the present invention is the use of a magnetic reading element of high track density, combined with a laser heating, thermally assisted write element as is generally defined in patent applications Ser. Nos. 09/005,914 and 09/248,766. The read/write head is capable of high density recording with a high signal to noise ratio with a design which lends itself to mass production.

Another aspect of the present invention is the use of an integrated optical waveguide and a magnetic write element (collectively referred to herein as thermally assisted write element). This thermally assisted write element is fabricated by forming an optical waveguide within the magnetic write gap of the slider using standard wafer fabrication processes.

Important features of this invention reside in the mounting of the laser diode to the head gimbal assembly. The laser diode is attached to a small silicon chip which, in turn, is mounted to the suspension, for example the flexure. The silicon chip serves not only as a mounting block to the suspension but, due to its high thermal conductivity, it also serves as a first stage heat sink, conducting heat away from the laser diode and into the stainless steel suspension. The silicon mounting block also serves as the anode connection for the laser.

Another important aspect of the laser mounting is that, although it is attached to the suspension, it is positioned in close proximity to the backside of the slider, without making contact therewith, and the laser emitter is aligned to the input end of the optical waveguide such that the laser beam is coupled directly to the optical waveguide, eliminating the need of other components such as optical fibers or lenses. The waveguide directs the laser beam onto a target spot on, or within the data storage medium.

Other important aspects of the design lie in the fabrication of an optical coupling device that includes the laser assembly of the present invention. A unique aspect of the laser assembly lies in the silicon mounting blocks. The silicon mounting blocks are produced via conventional deep etch processes. The individual blocks are formed in the silicon wafer and left in the array in "breakaway form". The laser diodes are soldered to the mounting blocks, "burned in" and tested. A wire is die bonded between the laser diode cathode surface and the silicon mounting block anode surface, to serve first as shorting protection against electro-static discharge (ESD) and later to be cut in half and bonded to the Laser power supply circuitry.

An important aspect of the mounting blocks being made from silicon in addition to the production efficiency of the wafer process, is the high thermal conductivity of silicon which serves a critical function of conducting heat away from the laser diode and into the suspension.

The foregoing and other features of the present invention are realized by this read/write head design which is structurally significantly less complex than conventional optical devices, that requires minimal additional optical components and minimal optical alignment, that can write at higher track densities, and that has a good control of the data and servo tracks. The read/write head uses a laser coupled directly to a waveguide, which is integral with the slider, to heat the medium for lowering its coercivity during the write function. The lowered medium coercivity, caused by laser heating allows a relatively weak magnetic field to be used to write data, which upon cooling to ambient temperature becomes magnetically hard and resistant to self erasure over time. The direct coupling of the laser to the waveguide is an important consideration for eliminating costly components and alignments.

BRIEF DESCRIPTION OF THE DRAWINGS

The features of the present invention and the manner of attaining them will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF THE INVENTION

Figure 1:
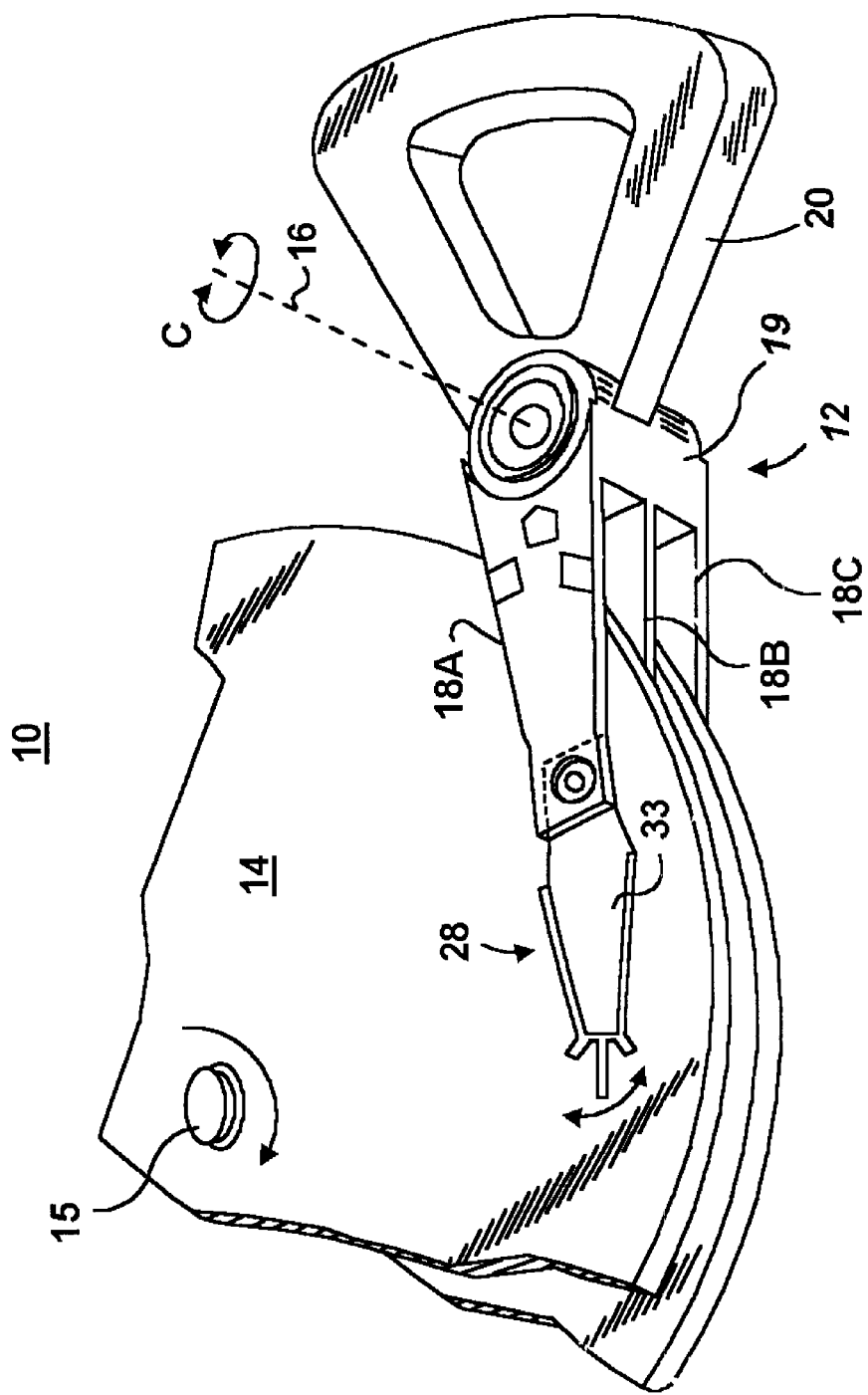
FIG. 1 is a fragmentary perspective view of a data storage system utilizing a read/write element according to the invention.

FIG. 1 illustrates a disk drive 10 comprised of a head stack assembly (HSA) 12 and a stack of spaced apart data storage disks or media 14 that are rotatable about a common shaft 15. The head stack assembly 12 is rotatable about an actuator axis 16 in the direction of the arrow C, and includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
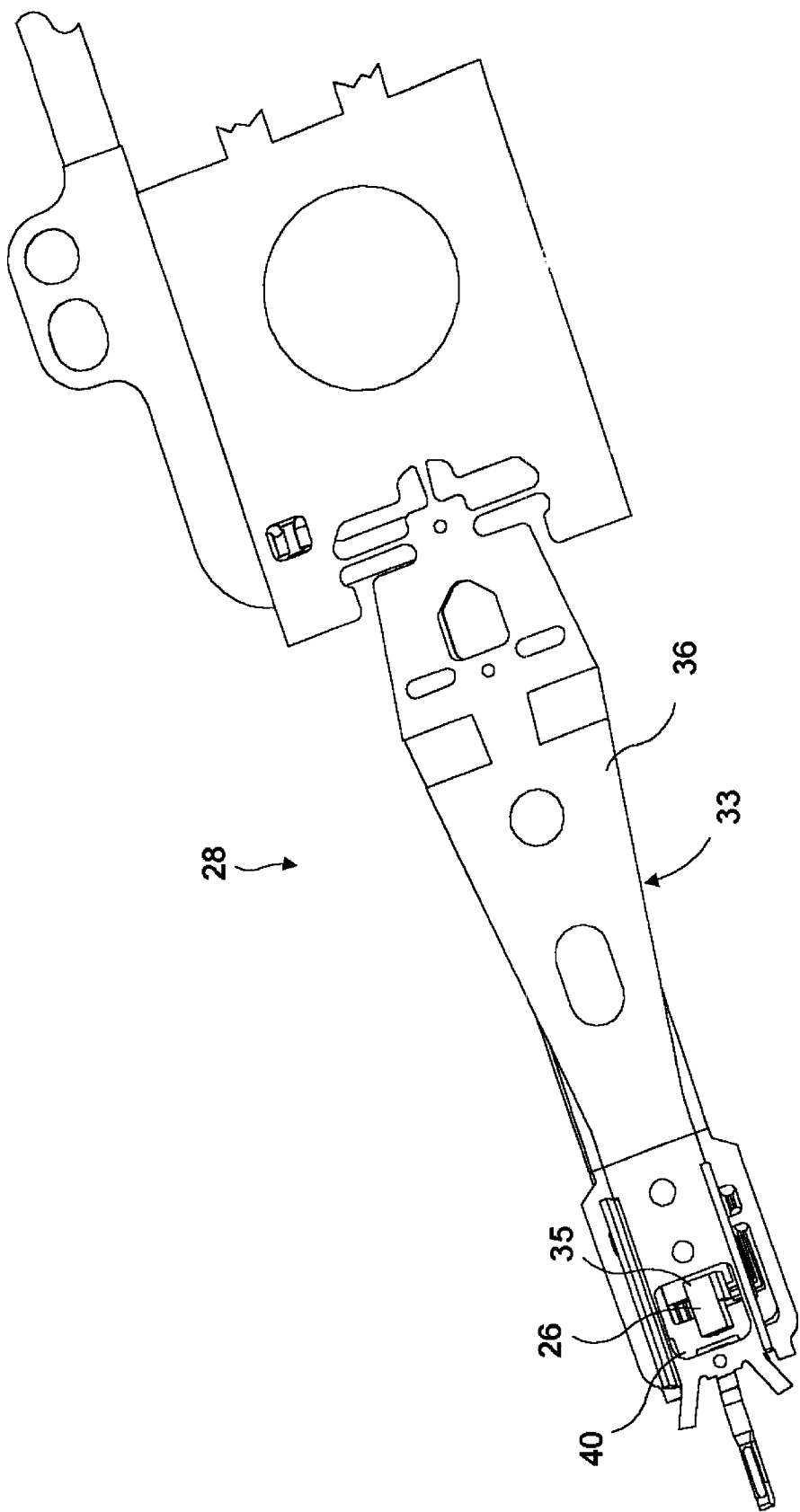
FIG. 2 is a top view of a head gimbal assembly (HGA) comprised of a suspension, a slider that incorporates the read/write element and a laser assembly including a mounting block, for use in a head stack assembly (HSA)

The head stack assembly 12 also includes a plurality of head gimbal assemblies (HGAs) 28 that are secured to the actuator arms 18A, 18B, 18C. As further illustrated in FIGS. 2 and 3, a HGA 28 is comprised of three main components: a suspension 33, a slider 35 and a laser assembly 22. The suspension 33 is formed of a load beam 36 and a flexure 40. The slider 35 is bonded to the flexure 40, which, in turn, is secured to the free end of the load beam 36.

Figure 3:
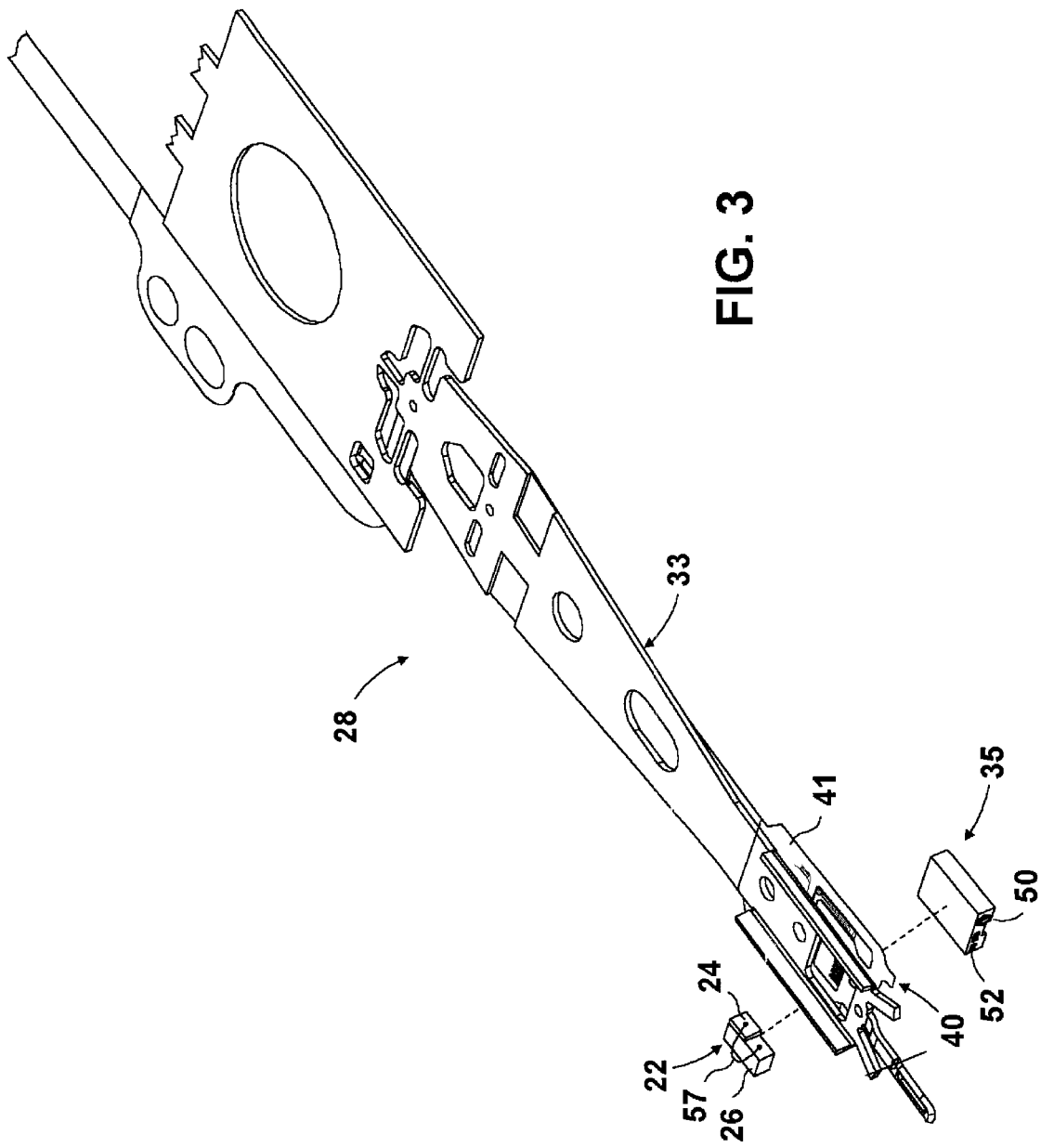
FIG. 3 is an exploded perspective view of the three main components of the HGA of FIG. 2.
Figure 3A:
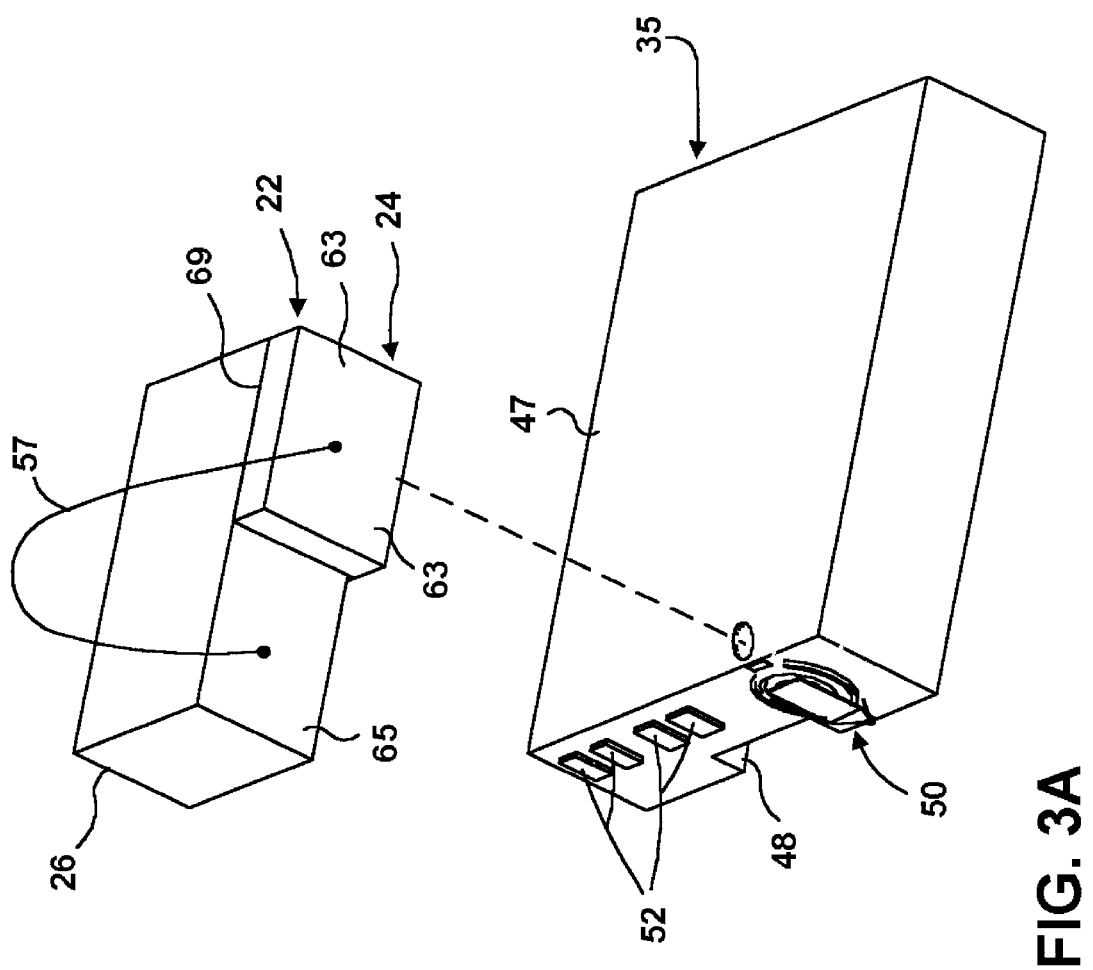
FIG. 3A is an enlarged, perspective, exploded view of the slider and the laser assembly, prior to attachment to the suspension.

With further reference to FIGS. 3 and 3A, an exemplary embodiment of the laser assembly 22 includes a laser diode 24 and a mounting block 26. The laser assembly 22 is secured to the flexure 40 and consequently to the free end of the load beam 36. While the present invention will be explained in relation to a laser source, it should be understood that other light or heat sources can alternatively be used within the scope of the present invention. The flexure 40 can be formed by means of known additive or subtractive processes, or by means of other available techniques.

The slider 35 includes a slider body 47 with a trailing edge to which a read/write element 50 is affixed. The slider body 47 further includes an air bearing surface 48 designed to "float" the slider body 47 over the cushion of air which follows the spinning disk 14, in order to precisely space the read/write element 50 from the magnetic medium on or within the disk 14.

The read/write element 50 includes a plurality of pads 52 that facilitate the transfer of electrical signals to and from the read/write element 50.

Figure 4:
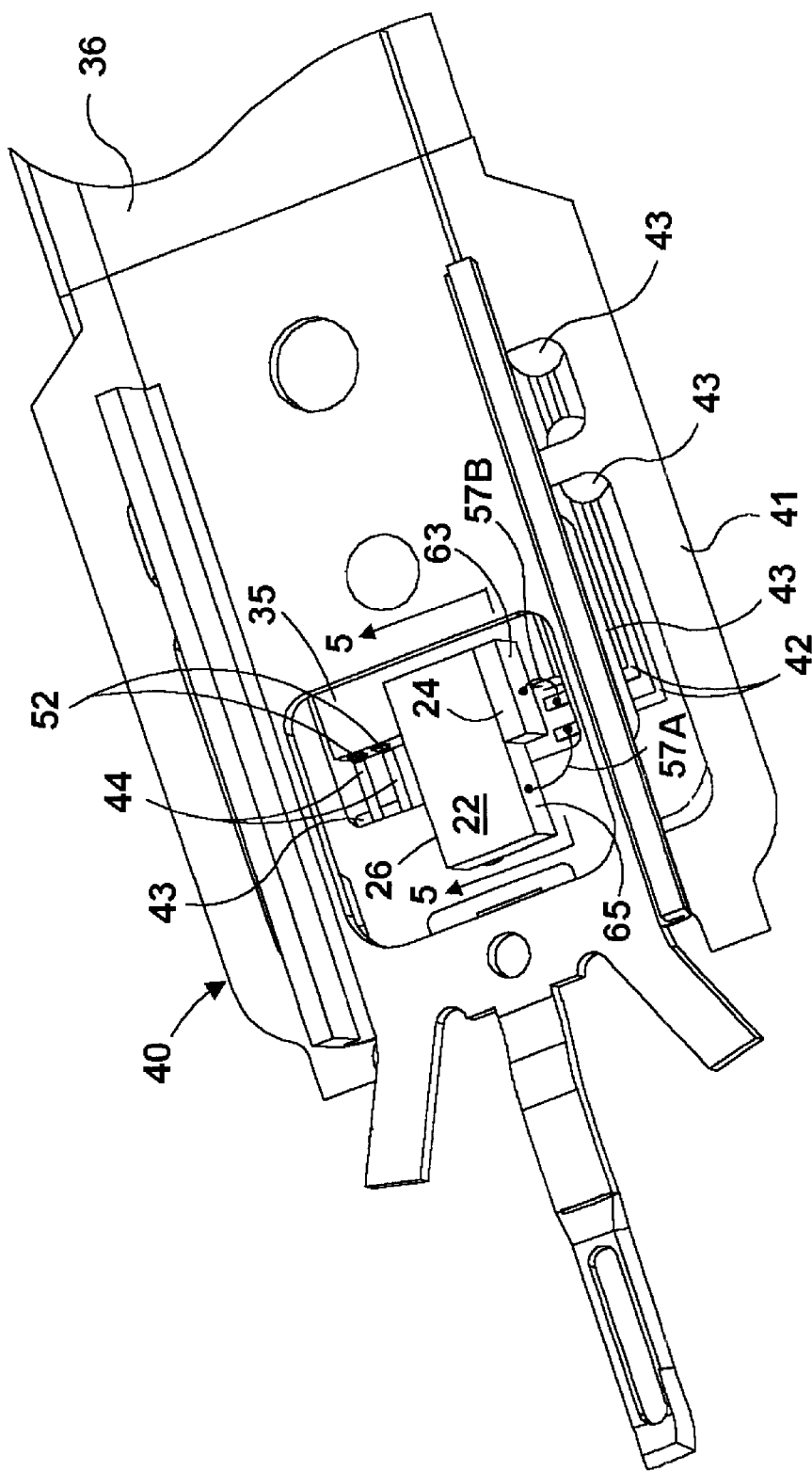
FIG. 4 is a greatly enlarged, fragmentary, top view of the HGA of FIG. 2.

As illustrated in FIG. 3 and with further reference to FIG. 4, the suspension 33 includes, in addition to the load beam 36 and the flexure 40, and a plurality of electrical traces 42, 44. The flexure 40 is formed of a stainless steel frame 41 that support the slider 35, and the traces 42, 44. The traces 42, 44 are electrically insulated from the flexure frame 41 by, for example, a plurality of polyimide pads 43 that also forms part of the of the suspension 33.

The flexure traces 42 are connected to, and conduct electrical current to the laser diode 24. The flexure traces 44 are connected to the pads 52 of the read/write element 50 (FIG. 3A), by for example ball bonding, tab bonding, wire bonding, or soldering. The traces 44 provide signals to and from the read/write element 50.

With reference to FIGS. 3, 3A, 4 and 4A the laser assembly 22 includes, in addition to the laser diode 24 and the mounting block 26, a shorting/connecting wire 57. Prior to assembling the laser assembly 22 to the suspension 33 (FIG. 3A), the wire 57 is attached at one end to a cathode surface 63 of the laser diode 24 and at the other end to an electrical conductive surface (film or layer) 65 of the mounting block 26. The conductive surface 65 can be either deposited or formed on the mounting block 26. This "shorting" connection of the wire 57 provides ESD protection to the laser diode 24 prior to the assembly of the head gimbal assembly 28.

The conductive surface 65 of the mounting block 26 is, in turn, connected to an anode surface 69 of the laser diode 24. In this example, the anode surface 69 is oppositely disposed relative to the cathode surface 63.

The HGA 28 will now be described with reference to FIGS. 4, 4A and 5. The read/write element 50 is deposited or formed at the trailing edged of the slider 35, and includes for example a write element (or section) 60 and a read element (or section) 61. The read element 61 includes a magneto resistive (MR) read stripe 62 positioned between a first shield 80 and a second shield 85. The presence of a written magnetic data bit on the disk 14 is sensed by the change in resistance of the read stripe 62 through two of four traces 44 of the flexure 40. The traces 44 are connected to the read stripe 62 through traces (not shown) on the slider 35 that are connected to the contact pads 52 of the slider 35.

The write element 60 includes a first pole 85 which may also function as the second shield 85 of the read element 61. The write element 60 further includes a second pole 96 separated from the first pole 85 by the write gap 98. A deposited coil 94 is connected to contact pads 52 which are in turn connected to two of the four traces 44 of the slider 35. When current is passed through the coil 44, a magnetic field is created in the first and second poles 85 and 96, respectively, and across the write gap 98. The fringe field at the write gap 98 aligns the magnetic domains in the medium of the disk 14, as the medium passes under the write gap 98. This forms a bit when the coercivity of the medium relative to the fringe field is sufficiently low as a result of laser heating.

An optical waveguide 88 is formed or deposited in the gap 98 between the first and second poles 85, 96. In a preferred embodiment the waveguide 88 has a thickness ranging between 0.1 and 1.0 microns at the laser beam exit end adjacent the air bearing surface (ABS) of the slider 35. The waveguide 88 tapers to a thickness ranging between 2.0 and 20.0 microns at a laser beam entry end 70. This taper allows for the convenient alignment for coupling of the laser beam to the waveguide 88 at the entry end 70, and for the concentration of the laser beam at the exit end. This concentration of the laser beam heats the medium temporarily, for sufficiently lowering its coercivity in order to enable the fringe field from the write gap 98 to orient the magnetic domains in the medium, thus creating a magnetic bit. When the bit cools, the medium returns to a higher coercivity and is fixed at this condition making it resistant to demagnetization.

The slider 35 is bonded to the flexure 40 using for example adhesive 95. In an exemplary embodiment, one or more polyimide pads 43 form an integral part of the flexure 40 adjacent the slider 35, and the adhesive 95 is bonded to the polyimide pads 43. In this embodiment additional electrical conductive adhesive 96 is applied between the slider 35 and the flexure frame 41 in order to dissipate static electrical charge on the slider 35. In another preferred embodiment the polyimide pads 43 are omitted and replaced by a conductive adhesive that attaches the slider 35 directly to the flexure frame 41.

Attachment of the laser assembly 22 to the flexure 40 is performed such that a laser emitter 122 is aligned to the entry end 70 of the waveguide 88 with the proper spacing. This is done after the slider 35 is bonded to the flexure 40. A preferred method is to set a proper spacing "S" (or 74) between the emitter 122 of the laser diode 24 with respect to the entry end 70 of the waveguide 88 by retaining the slider 35 in a fixed position in an assembly fixture (not shown). The laser assembly 22 is also held in the assembly fixture in a nest with an x-y-z positioning capability. The laser assembly 22 is adjusted in the z direction until the correct spacing "S" is sensed by for example optical means. The spacing "S" can range for example between 2 and 50 microns, with a preferred spacing ranging between 10 and 30 microns, depending upon the size of the emitter 122 and the laser beam dispersion angle.

Figure 4A:
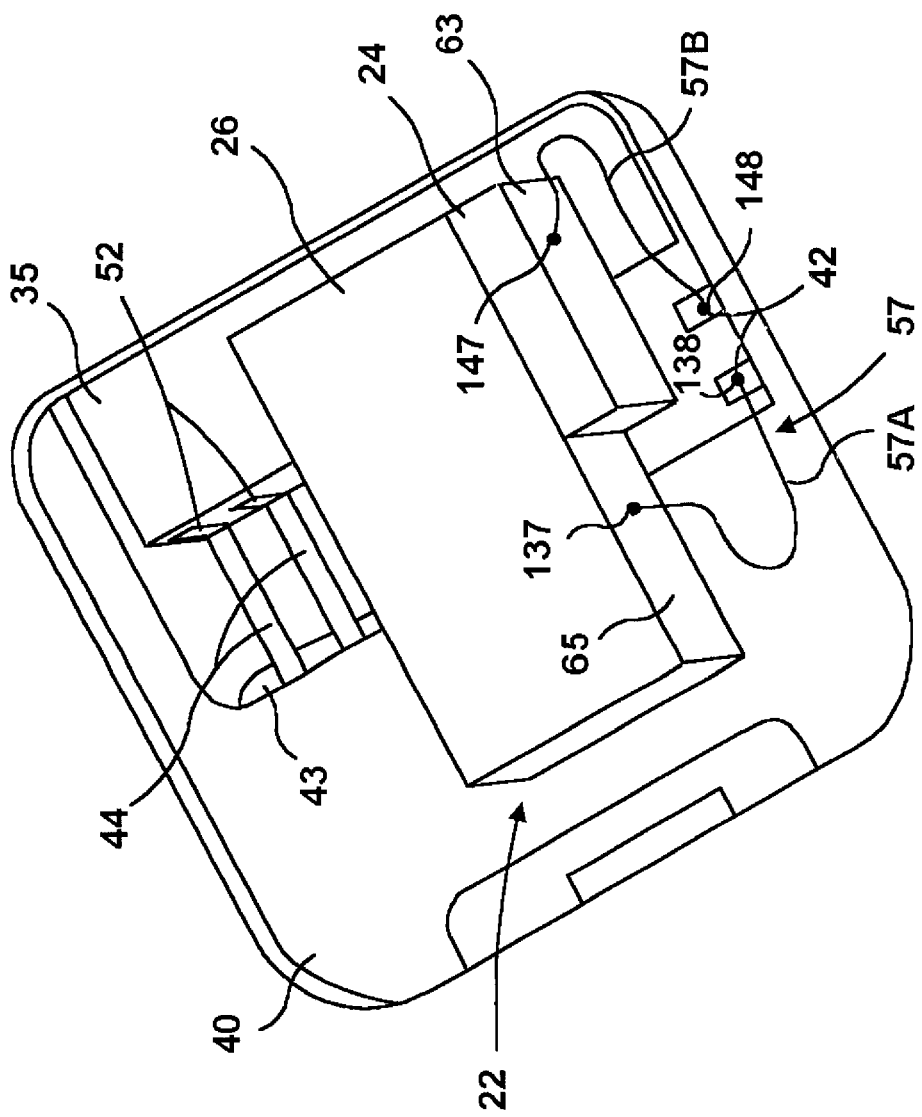
FIG. 4A is an enlarged view of part of the HGA of FIG. 4, illustrating the electrical connection to the slider pads and laser assembly.
Figure 5:
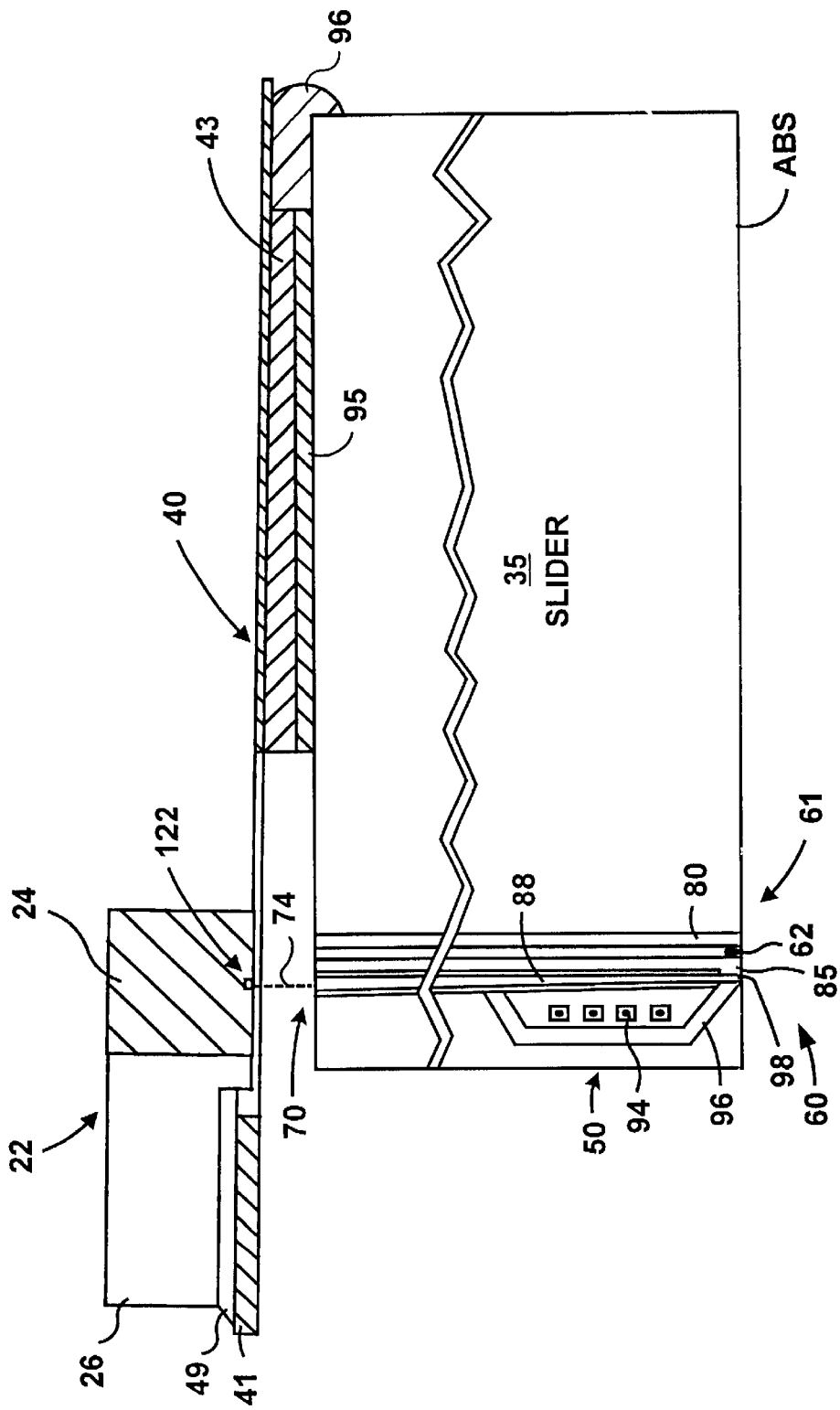
FIG. 5 is an enlarged, partly cross-sectional view of the slider, illustrating a waveguide, a laser diode, the mounting block, and a suspension flexure taken along section line 5—5 of FIG. 4, with only selective hatching for added visual clarity.
Figure 6:
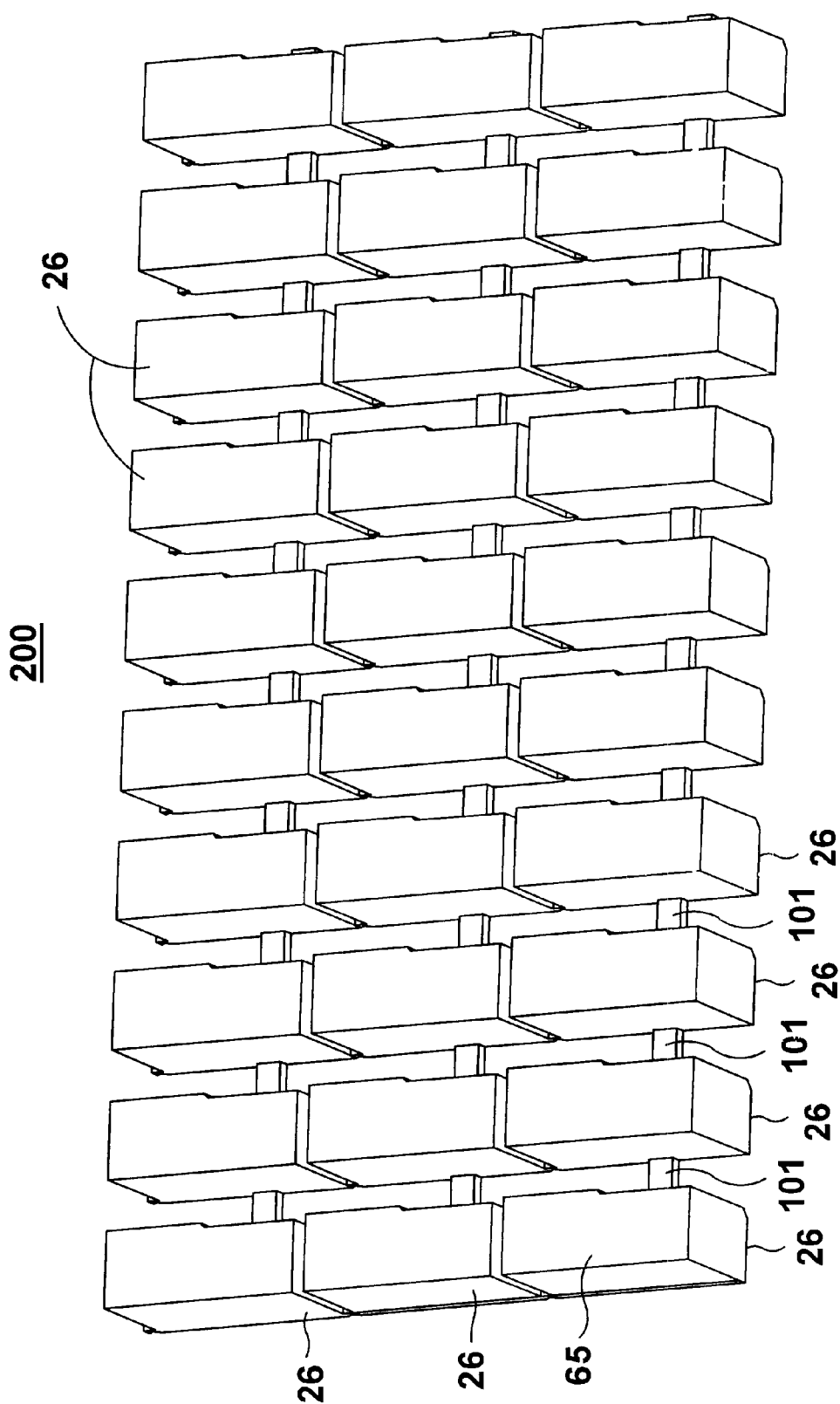
FIG. 6 is a fragmentary perspective view of an etched silicon wafer containing an array of laser mounting blocks in a "break-away" form.

The shorting/connecting wire 57 (FIGS. 3 and 3A) is cut near the center of its loop into two segments 57A, 57B (FIGS. 4, 4A). The first wire segment 57A has two terminals 137 and 138. Terminal 137 is connected by, for example, ultrasonic wire bonding or soldering to the conductive surface 65 of the mounting block 26, and terminal 138 is similarly connected to an electrical trace 42. The second wire segment 57B has two terminals 147, 148. Terminal 147 is connected to the cathode 63 of the laser diode 24, and terminal 148 is connected to another electrical trace 42.

With the laser diode 24 activated, the laser assembly 22 is moved in x and y directions while maintaining the correct z spacing "S" until the maximum output of the laser beam is sensed at the exit end of the waveguide 88, confirming alignment. Adhesive 49 is then applied and cured filling the gap between the mounting block 26 and flexure frame 41 (FIG. 5).

It should be noted that although the mounting block 26 of the laser assembly 22 is bonded to the flexure frame 41, it is possible to bond the mounting block 26 to the load beam 36 by making suitable modifications to the load beam 36 and the mounting block 26 of the laser assembly 22.

FIGS. 6, 7, 8 and 9 illustrate a preferred method of fabricating the laser assembly 22 will be explained. A silicon wafer 200 (FIG. 6) is deep etched to form a pattern of mounting blocks 26. The mounting blocks 26 are connected via a web of attachment tabs 101.

Figure 4B:
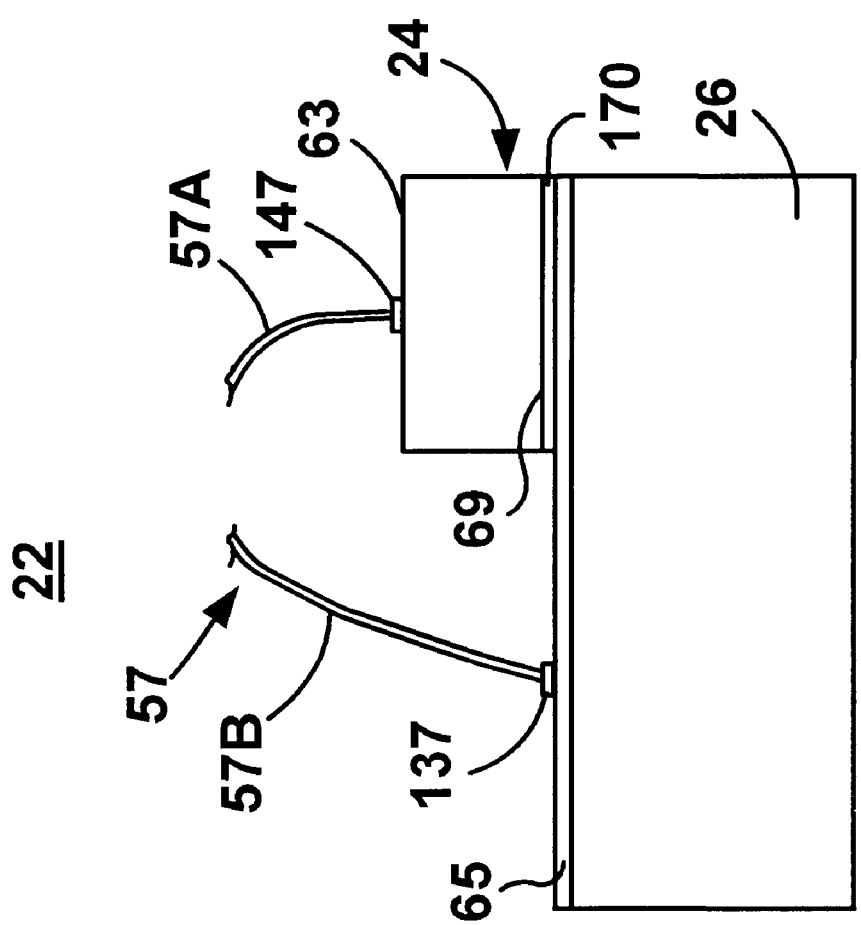
FIG. 4B is a top plan view of the laser assembly of FIG. 4A showing a shorting/connecting wire cut into two segments.
Figure 7:
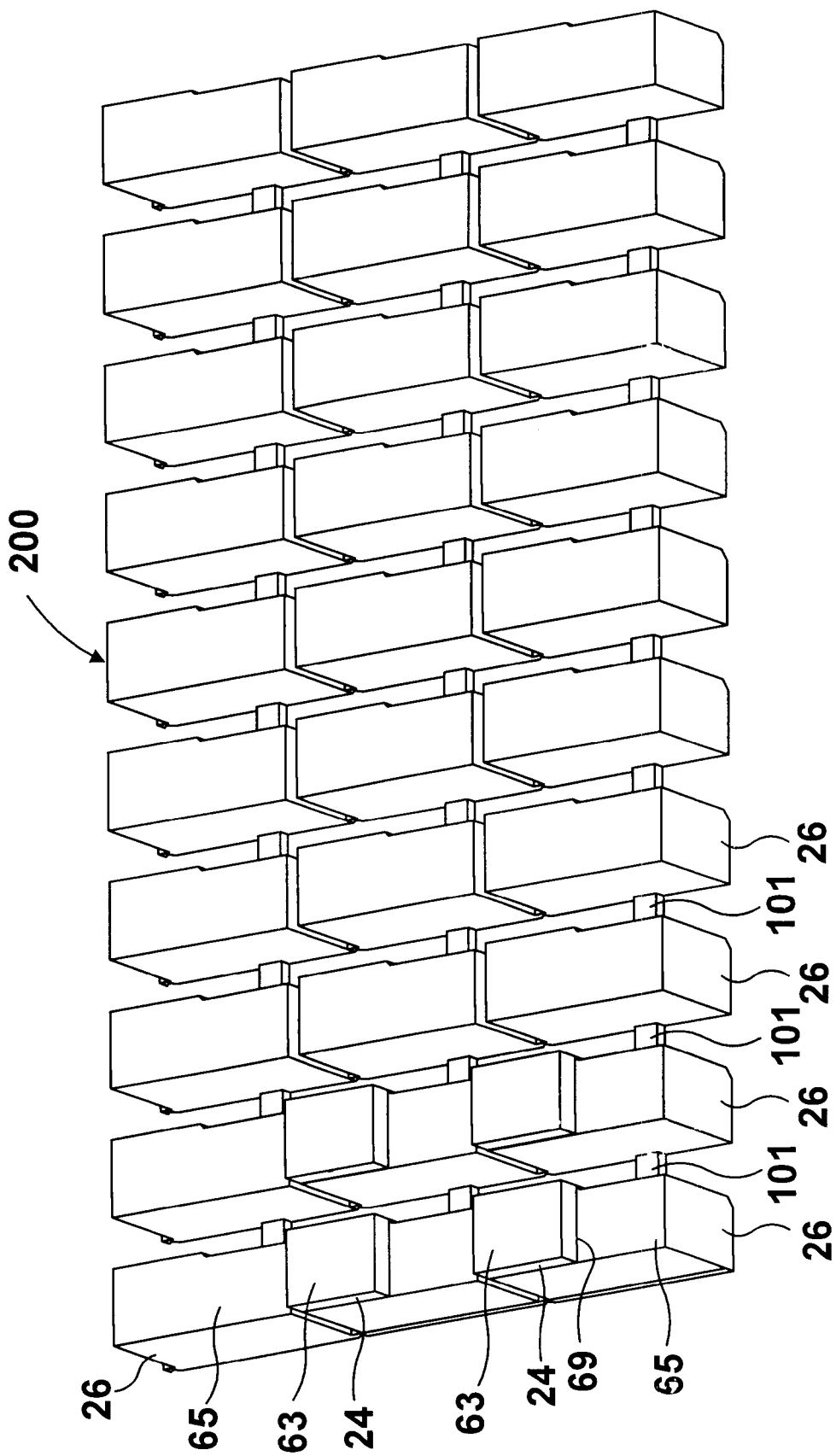
FIG. 7 is a fragmentary perspective view of the etched silicon wafer of FIG. 5 with laser diodes secured thereto.

FIG. 7 illustrates the step of mounting the laser diodes 24 on the wafer 200. While only four laser diodes 24 are shown for illustration purpose, it should be clear that in a preferred embodiment one laser diode 24 is secured to the conductive surface 65 of each mounting block 26 by, for instance, soldering the anode surface 69 of the laser diode 24 to the conductive surface 65. This is accomplished by depositing the electrically conductive surface 65 comprised of conductive material such as gold, silver, aluminum and/or solder on the mounting blocks 26, and then soldering the laser diodes 24 in place on the mounting blocks 26 by means of solder 170 (FIG. 4B). The conductive surface 65 extends beyond the contact area of the laser diode 24, occupying for example, the entire surface of the mounting block 26 upon which the laser diode 24 is soldered.

Figure 8:
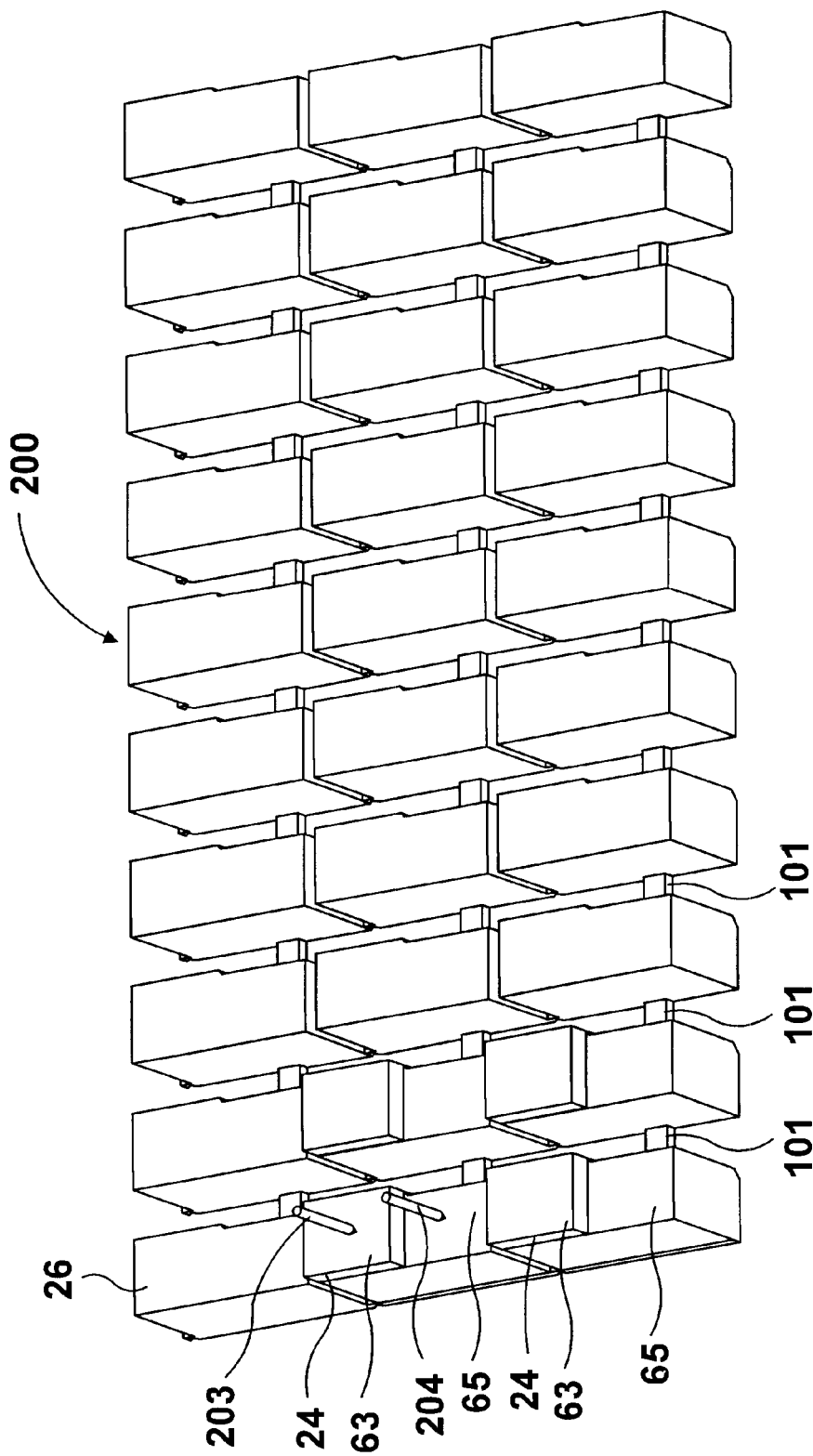
FIG. 8 is a fragmentary perspective view of the etched silicon wafer with laser diodes of FIG. 6, illustrating the position of test probes to test the individual laser diodes.

FIG. 8 illustrates the step of testing the laser diodes 24, while still in the silicon wafer (200) assembly stage. A test probe 203 is placed in contact with the cathode surface 63 of the laser diode 24. Another test probe 204 completes the testing circuit by contacting the electrically conductive surface 65 of the mounting block 26, which is soldered to the anode surface 69 of the laser diode 24. Activation of the testing circuit will confirm if the laser diode 24 is operational. The assembly may optionally be "burned in" by subjecting it to a critically high temperature for a sustained period prior to test to cull out laser diodes 24 prone to early failure. While FIG. 8 shows only two test probes 203, 204 are used as part of one testing circuit, it should be clear that additional testing circuits can be used as well.

Figure 9:
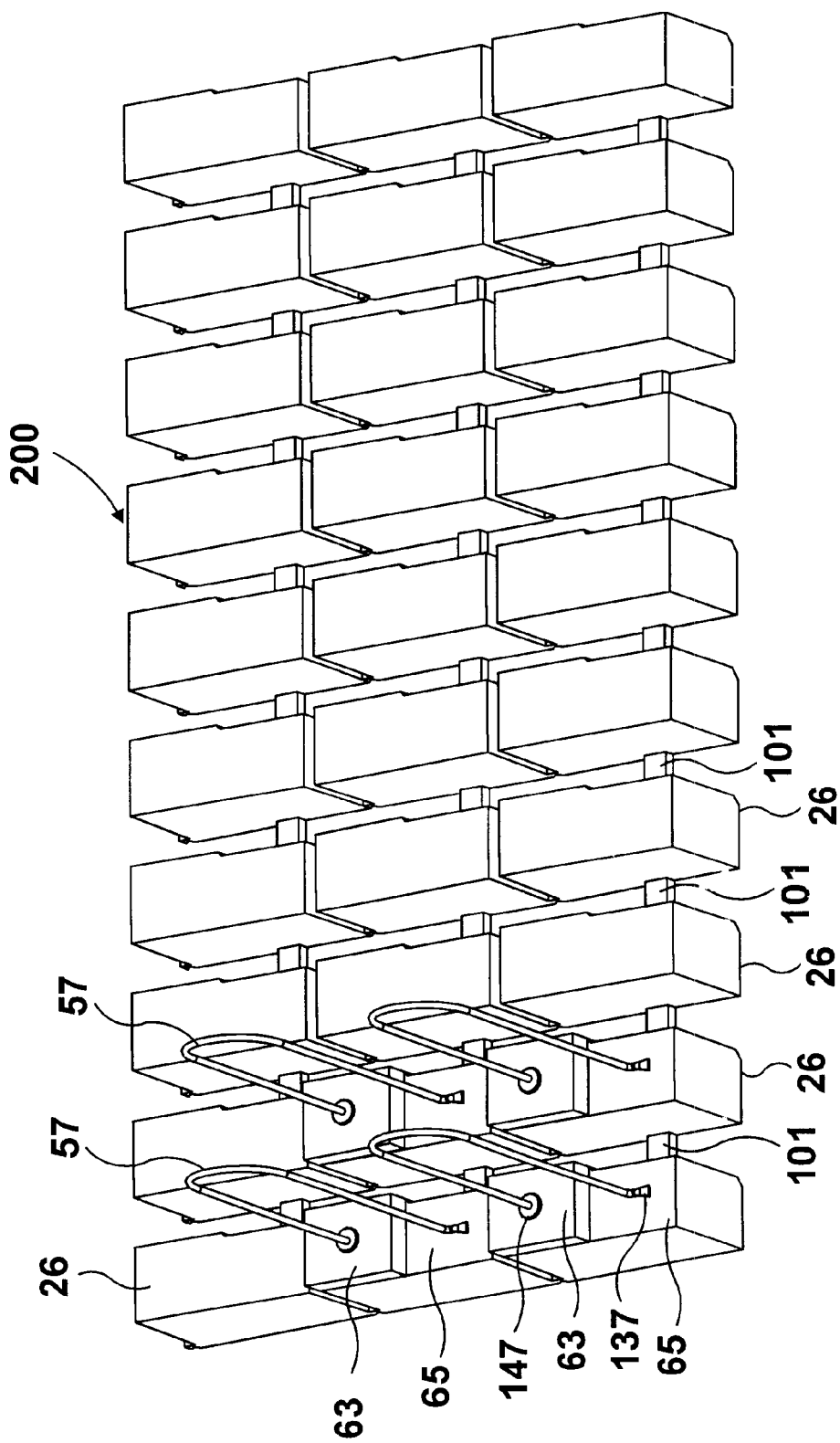
FIG. 9 is a fragmentary perspective view of an array of several laser assemblies comprised of the etched silicon wafer and laser diodes of FIG. 7 after die bonding a shorting/connecting wire.

With reference to FIG. 9, after the laser diode 24 is tested, the shorting/connecting wire 57 is attached between the cathode surface 63 of the laser diode 24 and the electrically conductive surface 65 of the mounting block 26 by, for example, die bonding or ultrasonic wire bonding. Since the electrically conductive surface 65 is soldered to the anode surface 69 of the laser diode 24 (FIG. 4B), the laser diode 24 becomes shorted out and protected against ESD damage during subsequent handling.

It should be understood that the geometry, compositions, and dimensions of the elements described herein may be modified within the scope of the invention and are not intended to be the exclusive; rather, they can be modified within the scope of the invention. For example, while the present invention is described in connection with a thermally assisted GMR, it should be clear that the laser assembly and laser beam coupling method between the laser assembly and the optical waveguide can be implemented in various other applications.

What is claimed is:

1. A head gimbal assembly including a suspension, comprising:
    a thermally assisted inductive write section for writing data onto a data storage medium;
    a magnetic read section integrated with said write section for reading data from said data storage medium;
    a laser assembly for providing a laser beam;
    said write section including an optical waveguide core between a first write pole and a second write pole to conduct said laser beam for heating said medium;
    said laser assembly being mounted on the suspension in optical alignment with said write section, so that optical coupling occurs between said laser assembly and said optical waveguide;
    wherein said laser assembly includes a mounting block;
    wherein said laser assembly includes an electrically conductive layer which is deposited on one surface of said mounting block;
    wherein said laser assembly includes a laser diode having an anode and a cathode; and
    wherein said electrically conductive layer is connected to said anode.

2. A head gimbal assembly according to claim 1, wherein the suspension includes a flexure; and
    wherein said laser assembly is mounted on said flexure.

3. A head gimbal assembly according to claim 1, wherein the suspension includes a load beam; and
    wherein said laser assembly is mounted on said load beam.

4. A head gimbal assembly according to claim 1, wherein said laser assembly includes a laser diode secured to a mounting block; and
    wherein said laser diode is disposed at a distance from said optical waveguide.

5. A head gimbal assembly according to claim 1, further including a slider that supports write section;
    wherein said laser assembly includes a laser diode secured to a mounting block; and
    wherein said laser diode is disposed at a distance from said slider.

6. A head gimbal assembly according to claim 1, wherein said mounting block is made of silicon.

7. A head gimbal assembly according to claim 1, wherein said laser assembly further includes an electrically conductive wire that connects said cathode to said conductive layer for minimizing electrostatic discharge.

8. A head gimbal assembly according to claim 1, wherein said laser assembly further includes an electrically conductive wire formed of a first wire segment and a second wire segment; and
    wherein said first wire segment is connected to said conductive layer, and said second wire segment is connected to said cathode.

9. A head gimbal assembly according to claim 8, wherein said suspension includes electrical traces that connect said laser assembly to a power source;
    wherein said first wire segment is connected between one of said electrical traces and said anode via said conductive layer; and
    wherein said second wire segment is connected between another one of said electrical traces and said cathode.

10. A head gimbal assembly according to claim 9, further including a slider that supports said read section and said write section;
    wherein the suspension includes a flexure comprised of a frame that supports said slider;
    wherein the suspension further includes a plurality of electrical traces, and a plurality of insulation pads that electrically insulate said frame from said traces.

11. A head gimbal assembly according to claim 10, wherein said write section includes a first pole and a second pole that are separated by a write gap, and an inductive element that generates a magnetic field.

12. A head gimbal assembly according to claim 11, wherein said optical waveguide is formed in said write gap between said first pole and said second pole.

13. A head gimbal assembly including a suspension, comprising:

a thermally assisted inductive write section for writing data onto a data storage medium;

a magnetic read section integrated with said write section for reading data from said data storage medium:

a laser assembly for providing a laser beam;

said write section including an optical waveguide core between a first write pole and a second write pole to conduct said laser beam for heating said medium;

said laser assembly being mounted on the suspension in optical alignment with said write section, so that optical coupling occurs between said laser assembly and said optical waveguide;

wherein said laser assembly includes a mounting block;

wherein said loser assembly includes an electrically conductive layer which is deposited on one surface of said mounting block;

wherein said laser assembly includes a laser diode having an anode and a cathode; and wherein said electrically conductive layer is connected to said cathode.

14. A head gimbal assembly according to claim 13, wherein said laser assembly further includes an electrically conductive wire that connects said anode to said conductive layer for minimizing electro-static discharge.

15. A head gimbal assembly according to claim 13, wherein said laser assembly further includes an electrically conductive wire formed of a first wire segment and a second wire segment; and wherein said first wire segment is connected to said conductive layer, and said second wire segment is connected to said anode.

16. A head gimbal assembly according to claim 15, wherein said suspension includes electrical traces that connect said laser assembly to a power source;

wherein said first wire segment is connected between one of said electrical traces and said cathode via said conductive layer; and wherein said second wire segment is connected between another one of said electrical traces and said anode.

17. A head gimbal assembly according to claim 16, further including a slider that supports said read section and said write section;

wherein the suspension includes a flexure comprised of a frame that supports said slider;

wherein the suspension further includes a plurality of electrical traces, and a plurality of insulation pads that electrically insulate said frame from said traces.

18. A head gimbal assembly according to claim 17, wherein said write section includes a first pole and a second pole that are separated by a write gap, and an inductive element that generates a magnetic field.

19. A head gimbal assembly according to claim 18, wherein said optical waveguide is formed in said write gap between said first pole and said second pole.

20. A head gimbal assembly according to claim 13, wherein the suspension includes a flexure; and wherein said laser assembly is mounted on said flexure.

21. A head gimbal assembly according to claim 13, wherein the suspension includes a load beam; and wherein said laser assembly is mounted on said load beam.

22. A head gimbal assembly according to claim 13, wherein said laser assembly includes a laser diode secured to a mounting block; and wherein said laser diode is disposed at a distance from said optical waveguide.

23. A head gimbal assembly according to claim 13, further including a slider that supports write section;

wherein said laser assembly includes a laser diode secured to a mounting block; and wherein said laser diode is disposed at a distance from said slider.

24. A head gimbal assembly according to claim 13, wherein said mounting block is made of silicon.

* * * * *